(12) United States Patent  
Carson

(10) Patent No.: US 7,845,211 B2  
(45) Date of Patent: Dec. 7, 2010

(54) APPARATUS AND METHOD FOR FORMING AND TESTING LENGTHS OF PIPE

(75) Inventor: Glenn Carson, Point Edward (CA)

(73) Assignee: CAR-BER Investments Inc., Point Edward (CA)

( * ) Notice: Subject to any disclaimer, the term of this patent is extended or adjusted under 35 U.S.C. 154(b) by 221 days.

(21) Appl. No.: 11/966,737

(22) Filed: Dec. 28, 2007

(65) Prior Publication Data

US 2008/0163676 A1  Jul. 10, 2008

Related U.S. Application Data

(63) Continuation-in-part of application No. 11/469,548, filed on Sep. 1, 2006, now Pat. No. 7,395,695, which is a continuation of application No. PCT/CA2005/000319, filed on Mar. 2, 2005.

(60) Provisional application No. 60/548,960, filed on Mar. 2, 2004.

(51) Int. Cl.  
 *G01M 3/28* (2006.01)  
 *G01N 7/00* (2006.01)

(52) U.S. Cl. .................. 73/46; 73/49.1; 73/49.85; 73/49.8

(58) Field of Classification Search ............... 73/40.5 R, 73/46, 49.1, 49.5, 49.6, 49.8; 285/21.1  
See application file for complete search history.

(56) References Cited

U.S. PATENT DOCUMENTS 3,498,518 A * 3/1970 Wheeler et al. ............... 228/50
3,731,525 A * 5/1973 Suter ............................ 73/49.5
4,067,228 A   1/1978 Elle et al.
4,382,379 A   5/1983 Kelly
4,852,393 A * 8/1989 Pate et al. .................... 73/49.5
4,858,464 A * 8/1989 Miller et al. ................. 73/49.5
5,844,127 A  12/1998 Berube et al.
6,131,441 A  10/2000 Berube et al.
6,463,791 B1 10/2002 Berube et al.
2007/0220957 A1 * 9/2007 Krah ........................... 73/49.5

FOREIGN PATENT DOCUMENTS

| CA | 2485354 A1 | 11/2000 |
| DE | 1220171 B | 6/1996 |
| EP | 0 727 651 B1 | 10/2002 |

OTHER PUBLICATIONS

International Search Report issued in PCT/CA2008/002211 filed on Dec. 24, 2008.

* cited by examiner

*Primary Examiner*—Daniel S Larkin  
(74) *Attorney, Agent, or Firm*—Santosh K. Chari; Blake, Cassels & Graydon LLP

(57) ABSTRACT

A pipe forming and testing apparatus includes a frame supporting a mandrel, the mandrel being adapted for positioning within the pipe, and two sealing devices connected to the mandrel and adapted to seal opposite ends of the pipe to create an annular space between the mandrel, the pipe, and the sealing devices. The pipe is formed from two or more pipe segments that are welded together. The apparatus includes at least one welding device for joining the pipe segments and preferably includes a rotating device for axially rotating the mandrel and pipe combination to facilitate the welding process. Once formed, the integrity of the pipe is tested by pressurizing the annular space and monitoring such pressure.

15 Claims, 15 Drawing Sheets

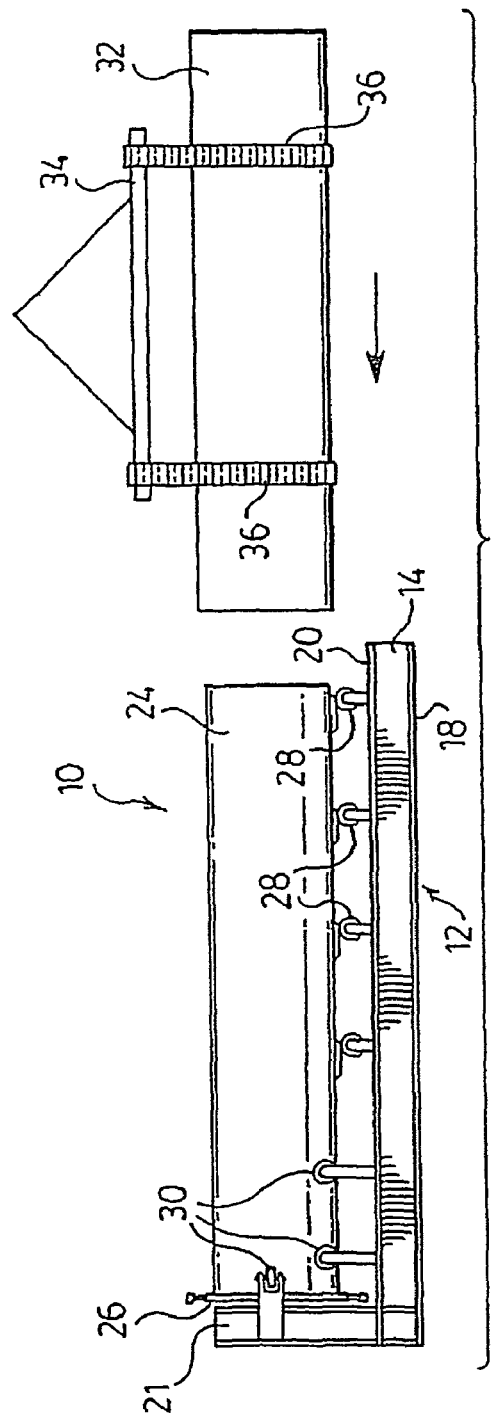
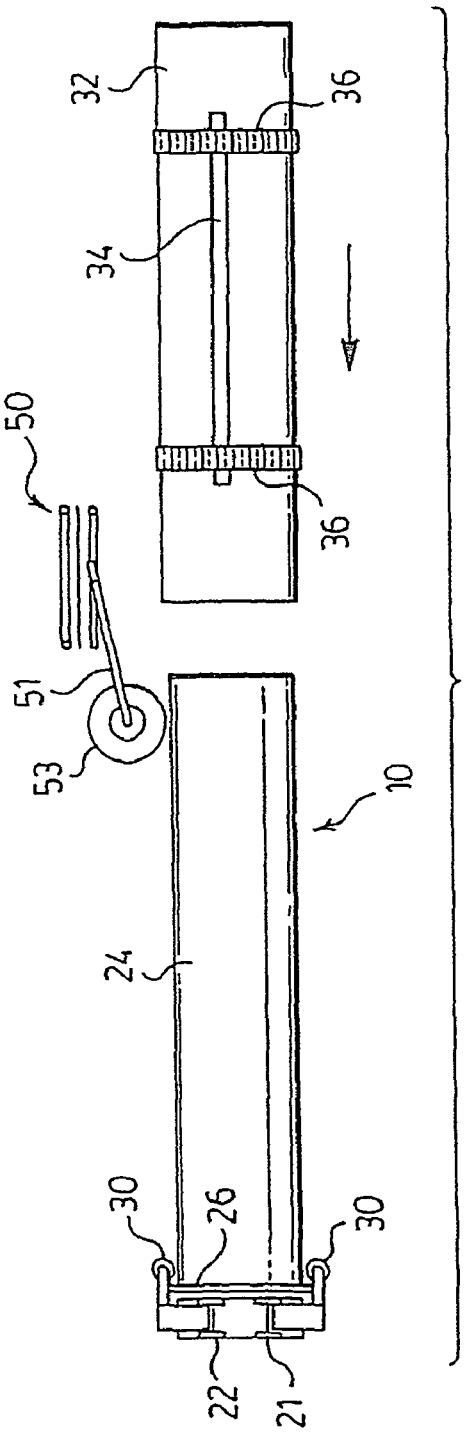
FIG. 1.
FIG. 2.

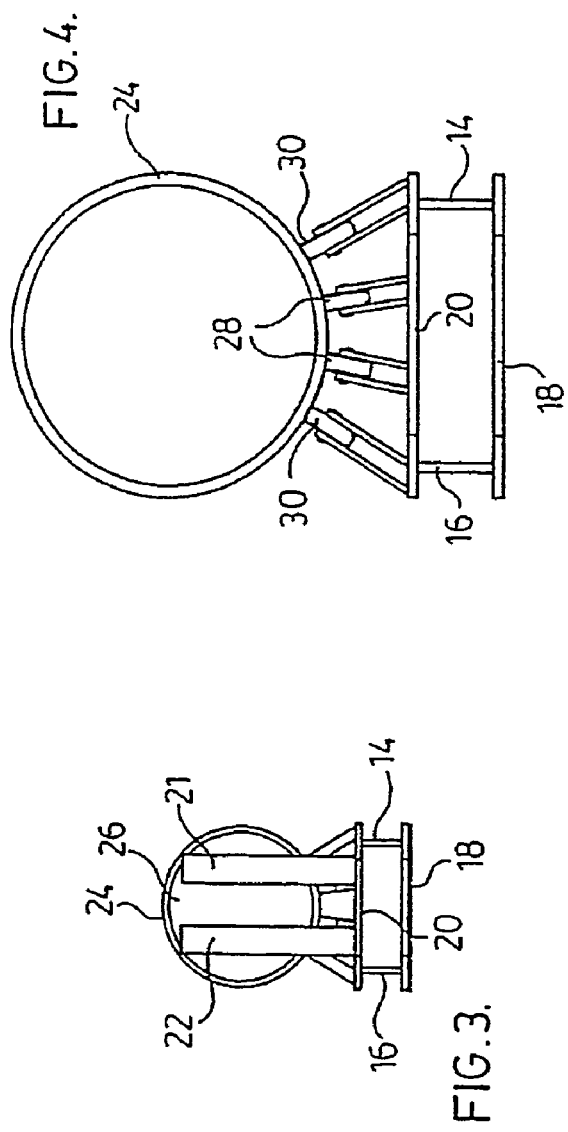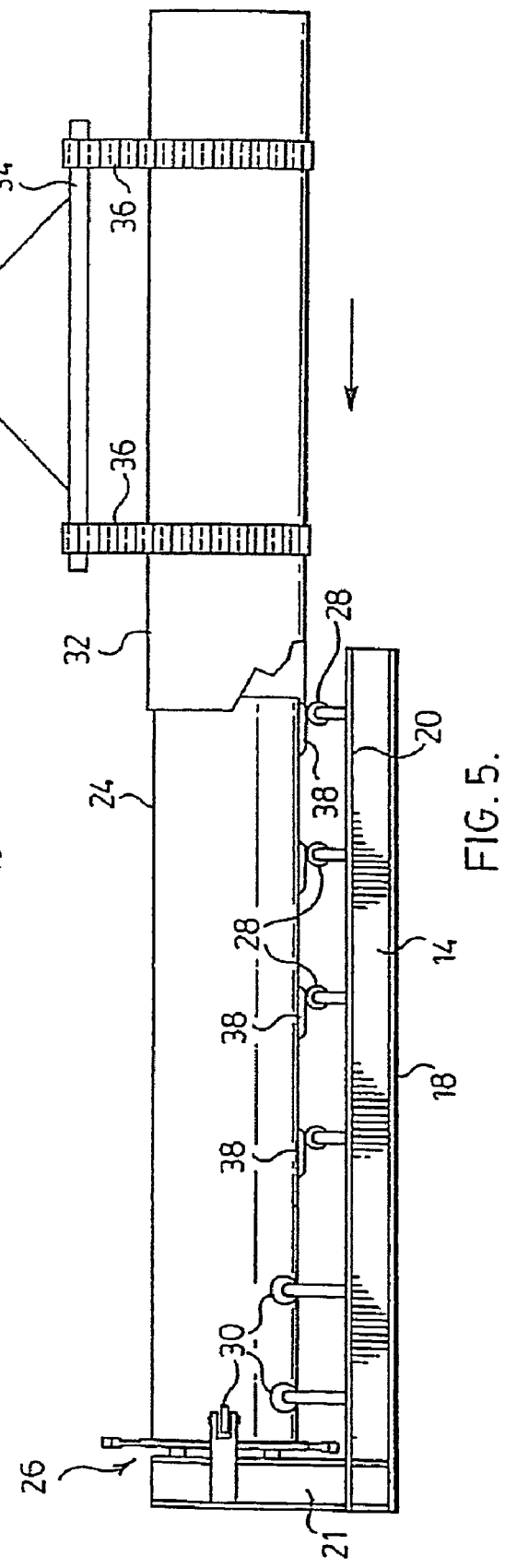

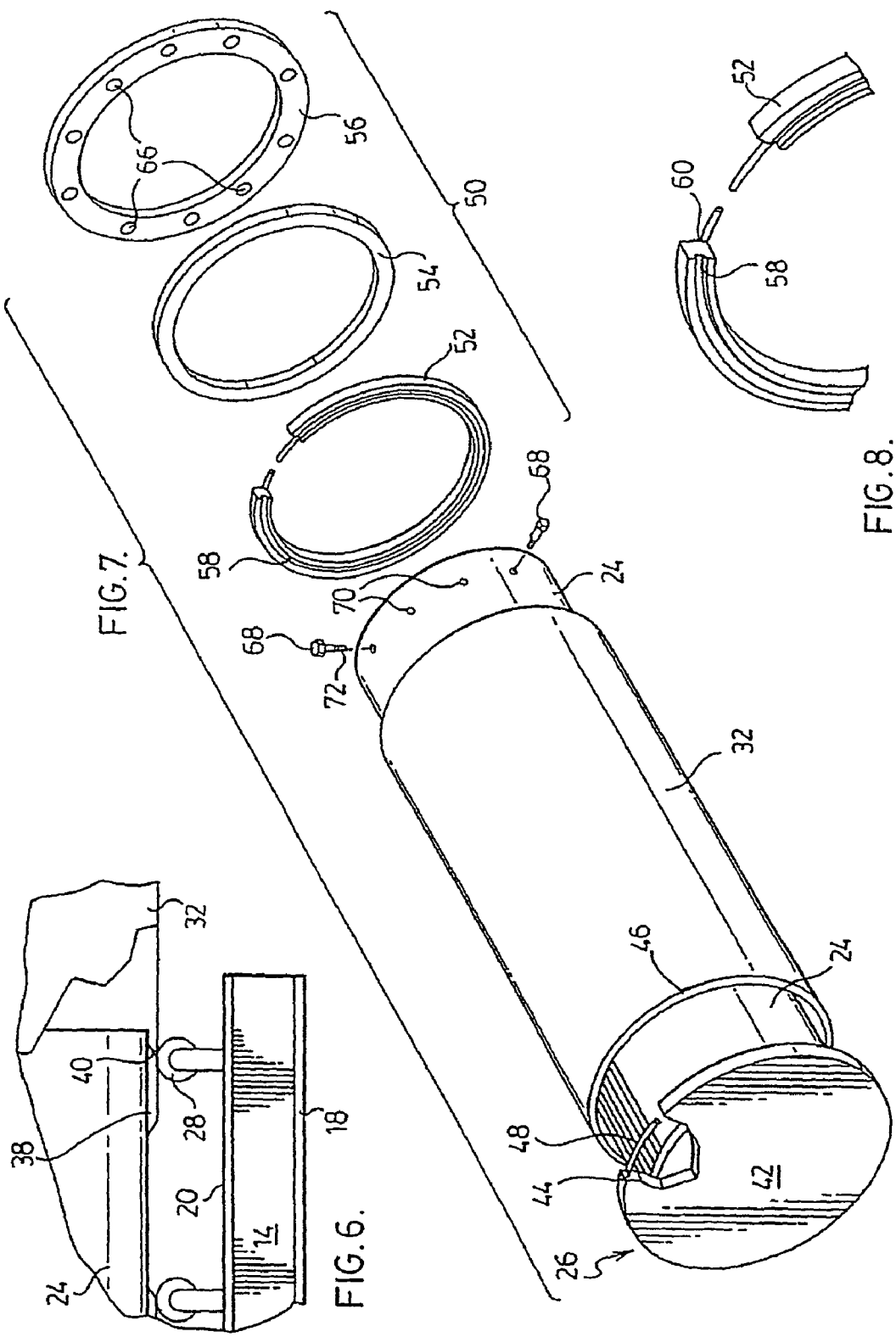

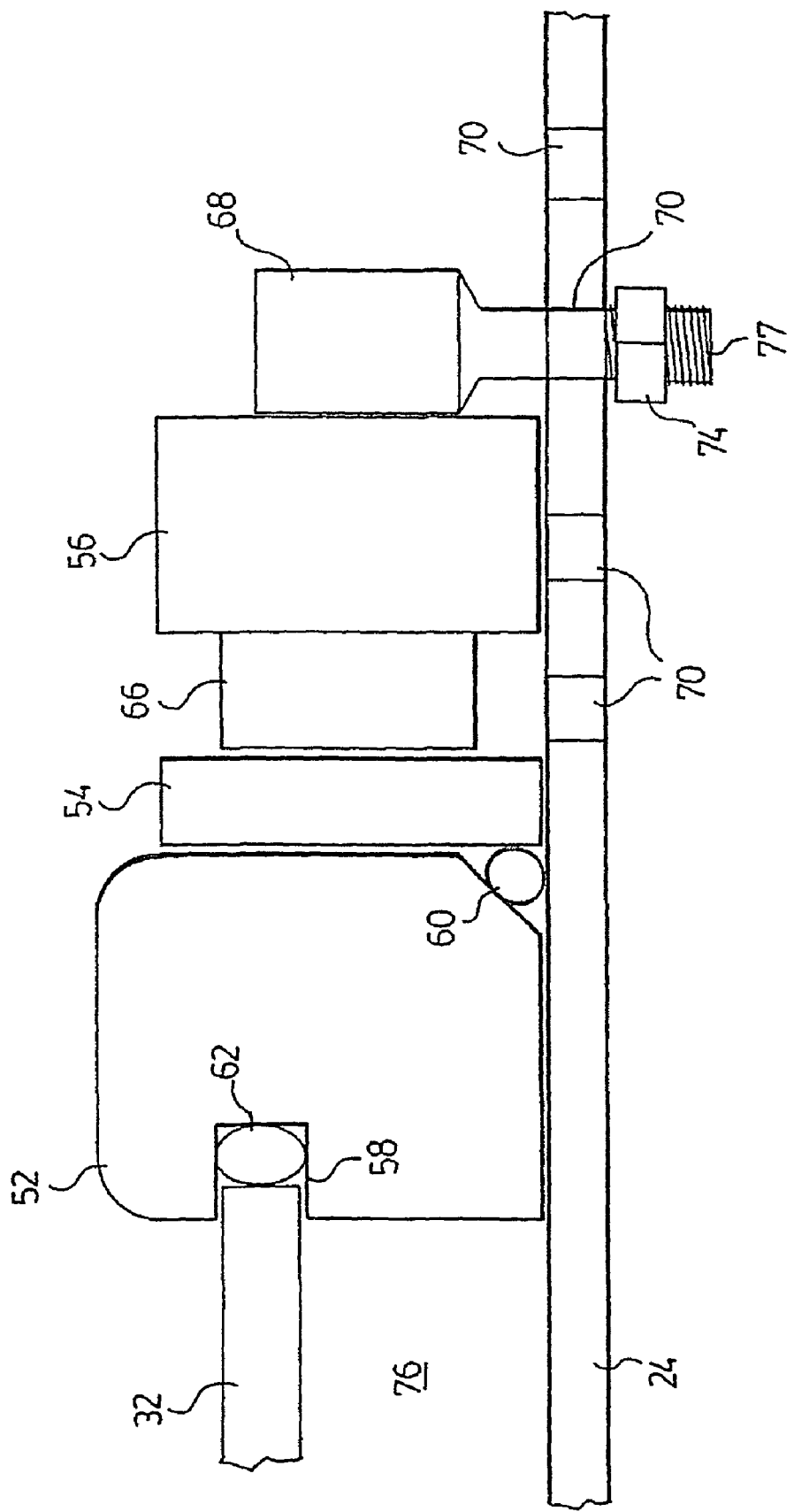

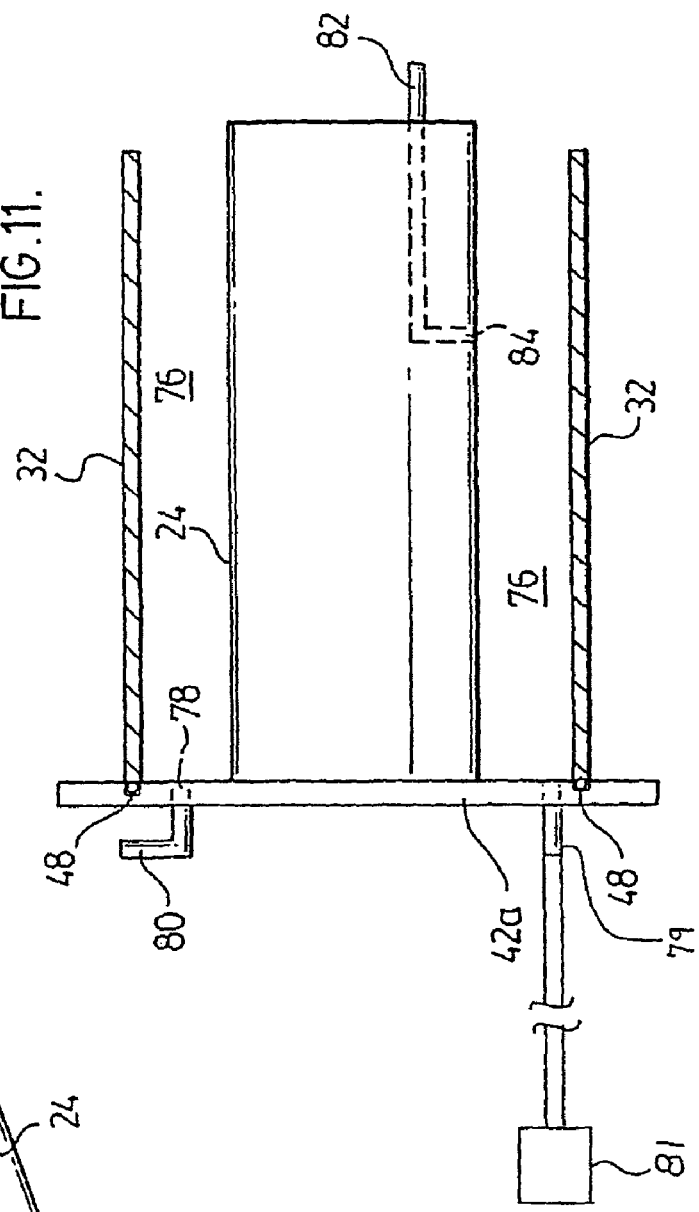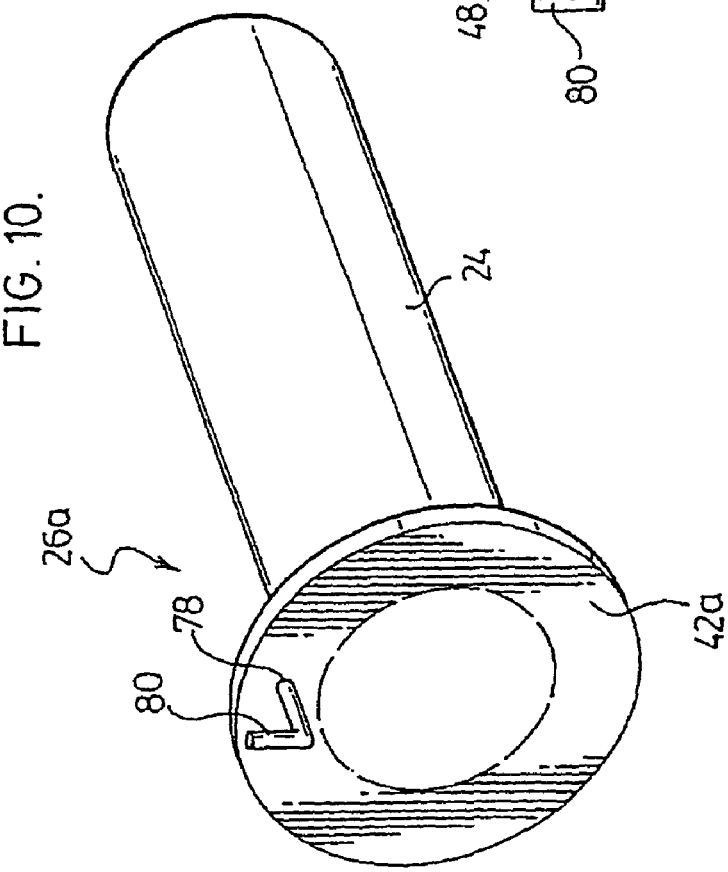

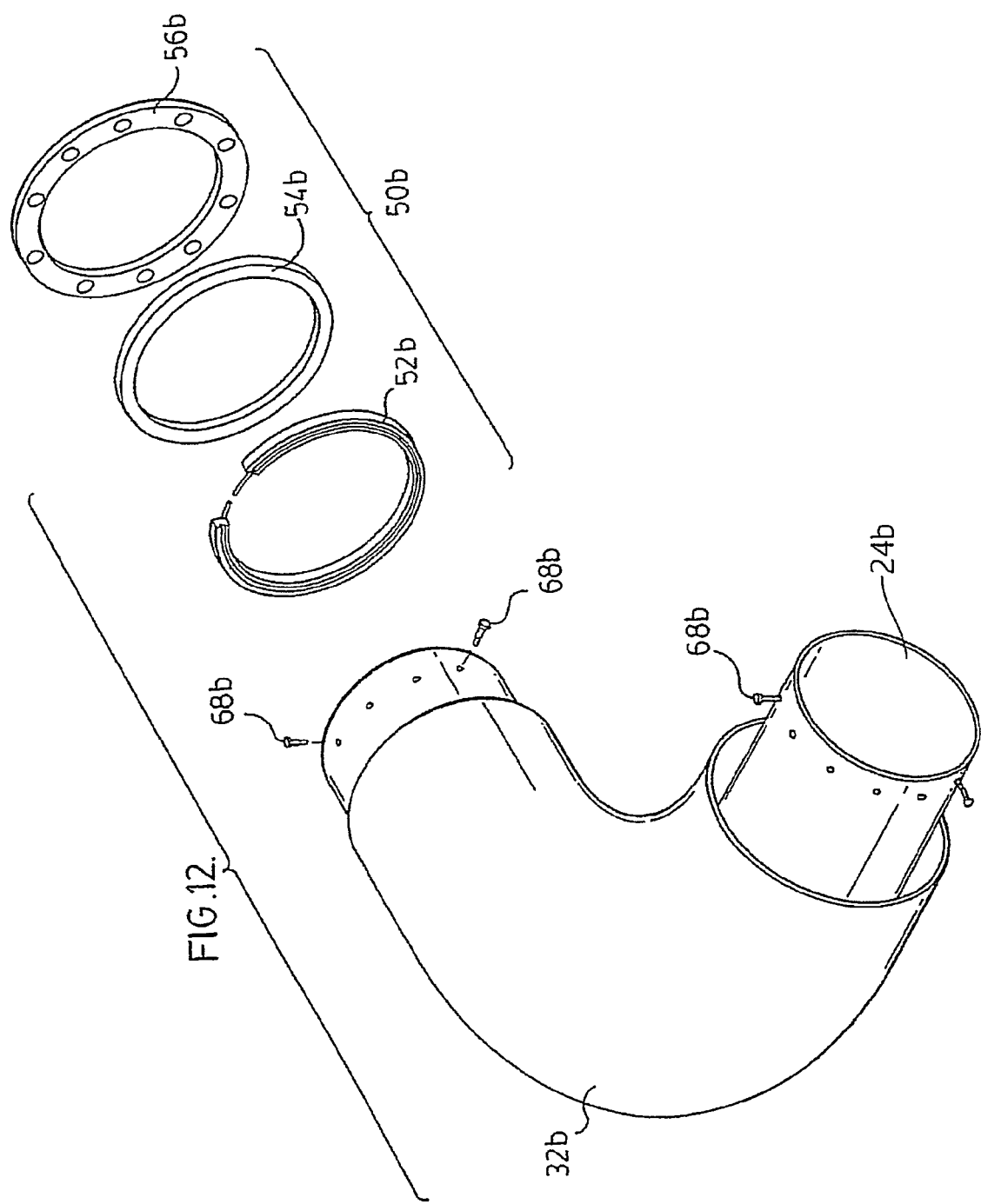

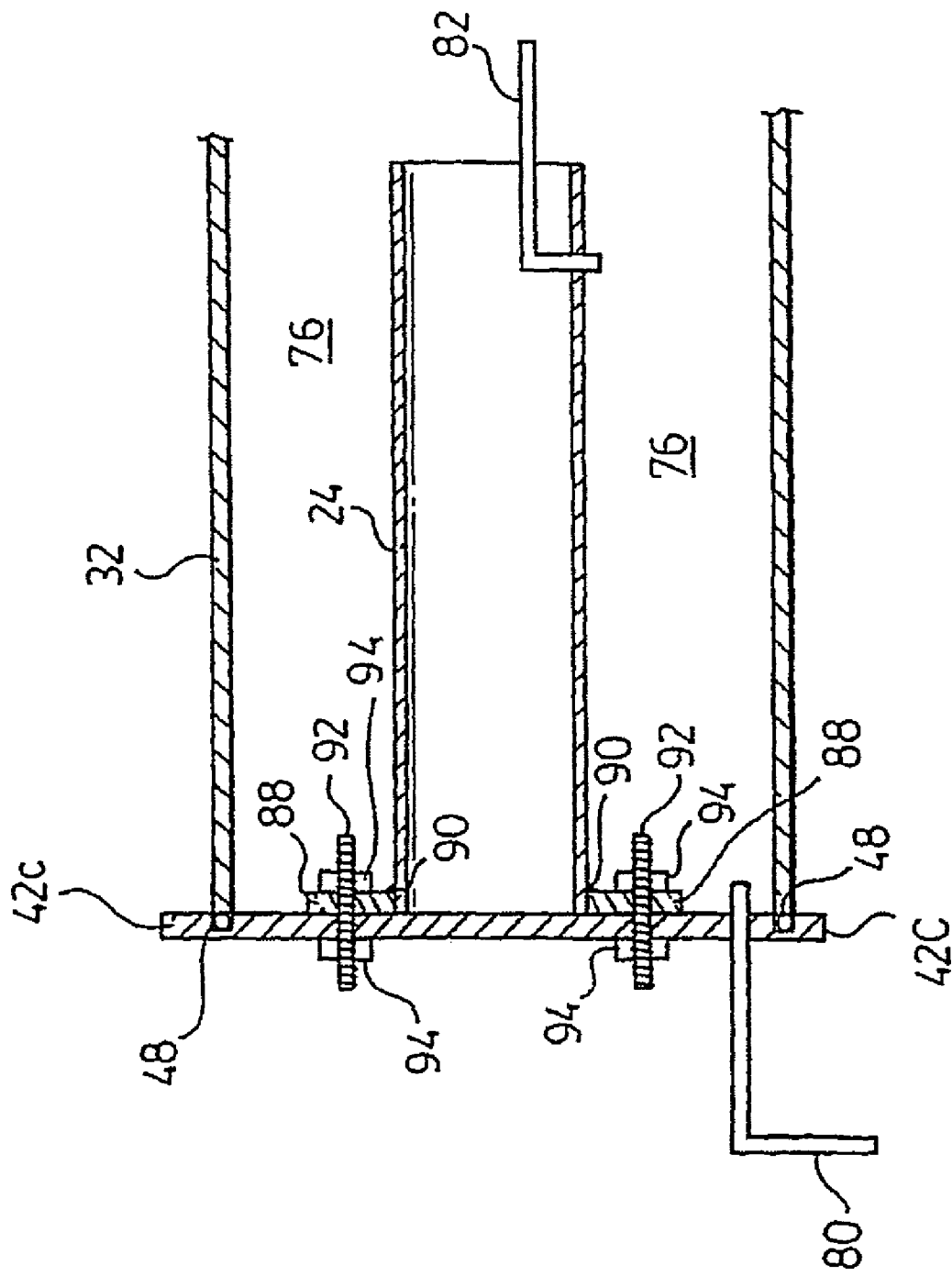

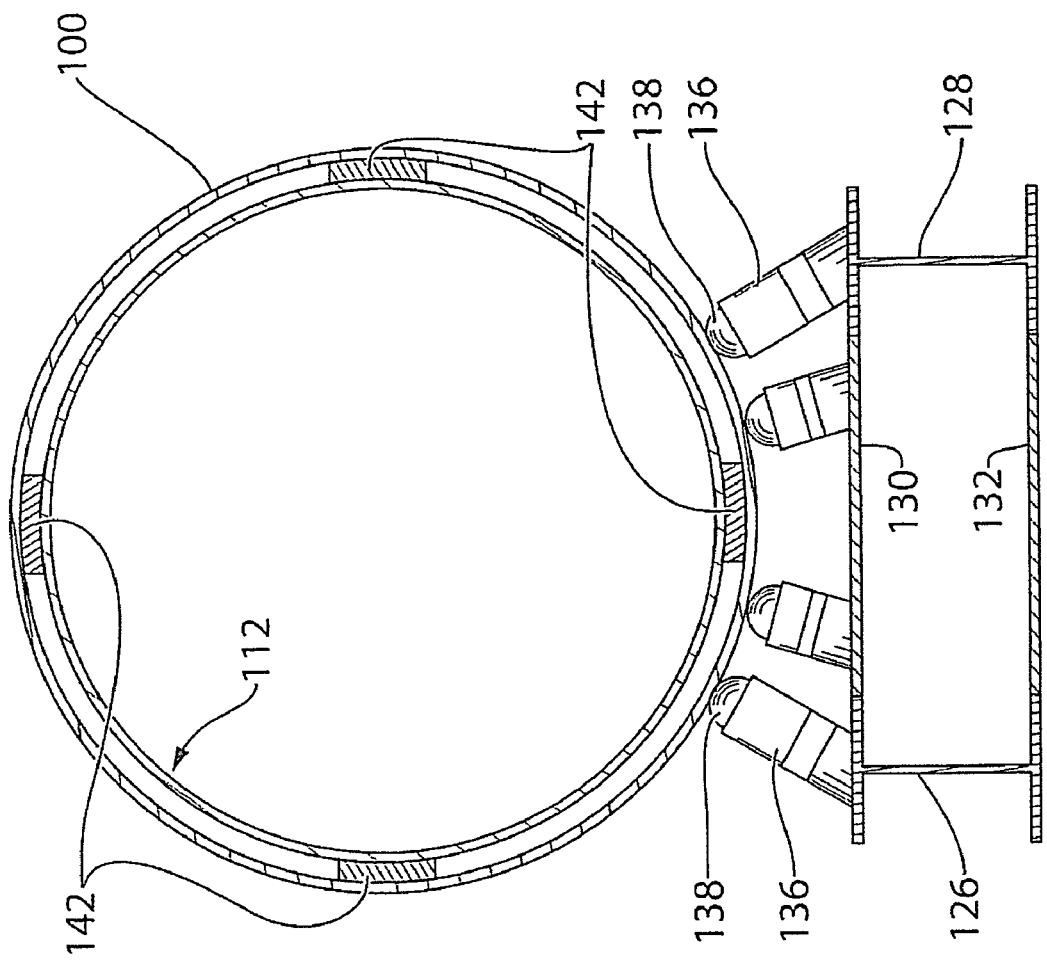

APPARATUS AND METHOD FOR FORMING AND TESTING LENGTHS OF PIPE

CROSS REFERENCE TO PRIOR APPLICATIONS

This application is a Continuation in Part of U.S. application Ser. No. 11/469,548, filed Sep. 1, 2006, now U.S. Pat. No. 7,395,695, which is a Continuation of PCT application number PCT/CA2005/000319, filed Mar. 2, 2005, which claims priority from U.S. Provisional application No. 60/548,960, filed Mar. 2, 2004. The entire contents of all the aforementioned applications are incorporated herein by reference.

FIELD OF THE INVENTION

The present invention relates to apparatus for forming pipes from two or more segments and sequentially testing the integrity of such formed pipes.

BACKGROUND OF THE INVENTION

Pipes and other such conduits are commonly used in many applications for conveying fluid materials between locations. In order to ensure safety, it is common to conduct integrity tests on pipes to identify any cracks or other such openings through which the fluid being conveyed may leak. These cracks may result from defective welds on the pipe or from a defect in the tube manufacturing process. Pipe integrity testing is particularly important in situations where the pipe is used to convey flammable or toxic substances or when the pipe is conveying fluids under high pressure.

Various apparatus and methods are known in the art for testing pipes. In some of these known methods, a pipe section is simply filled with a typically incompressible fluid and pressurized while monitoring the pressure within the pipe. Any pressure drop is indicative of a leak in the pipe wall. Although effective, these known methods are inefficient since they require the entire volume of the pipe to be filled and pressurized, which is problematic when the pipe volume is large due to either a large diameter or a long length.

The prior art provides various types of pipe testing devices such as those taught in the following U.S. Pat. Nos. 6,463,791; 6,131,441; and, 5,844,127 (all of which share a common inventor with the present invention). Although these devices have proven effective in conducting tests on sections of pipe, there exists a need for an apparatus that efficiently tests lengths of pipe. Such a device is taught in U.S. Pat. No. 4,067,228. This reference provides an apparatus having a mandrel for insertion within a pipe segment to create an annular space between the inner pipe wall and the outer surface of the mandrel. In order to conduct the integrity test, a small volume of fluid is injected in the annular space and pressurized. Although providing an efficient test method, the apparatus of this reference is quite complicated and difficult to move from one location to another. Further, this reference does not provide a means of testing curved sections of pipe.

In some cases, the pipe to be tested may be formed of two or more segments that are welded together. In such cases, the segments or sections of the pipe are first joined, typically by welding, on one apparatus and then moved to another apparatus for the testing step. As will be understood, this two step process results in increased equipment and time costs.

Thus, a need exists for a more efficient apparatus for testing the integrity of sections of pipes. In addition, a need exists for more efficiently joining and testing a pipe formed from two or more segments.

SUMMARY OF THE INVENTION

In one aspect, the invention provides an apparatus and method for forming a pipe from two or more sections and subsequently testing the integrity of such pipe.

In another aspect, the invention provides an apparatus including a frame, a mandrel attached to the frame and adapted to coaxially receive pipe segments there-over, and at least two sealing devices for sealing the ends of the pipe. The apparatus includes a welding device for joining the ends of adjacent pipe segments to form the pipe. The apparatus further includes a pressurizing apparatus for testing the integrity of the pipe.

Thus, in one aspect, the present invention provides an apparatus for testing the integrity of a pipe, the pipe having a first end with a first opening and a second end with a second opening, the pipe being formed of two or more segments, the apparatus comprising:
  a frame having a first end and a second end;
  an elongate mandrel having first and second ends and a length corresponding at least to the length of the pipe and an outer diameter less than the inner diameter of the pipe wherein, when in use, the mandrel is adapted to be received within the pipe;
  the mandrel being supported on the frame and with the first end of the mandrel being secured to the first end of the frame;
  the first end of the mandrel including a first sealing device for sealing the first opening of the pipe and the second end of the mandrel including a second sealing device for sealing the second opening of the pipe, whereby, when in use, a generally annular space is created between the mandrel, the pipe, and the first and second sealing devices;
  the apparatus including one or more ports for filling the annular space with a pressurizing fluid or for voiding the annular space of air or the fluid and a means for monitoring the pressure within the annular space;
  the apparatus further including a means for permanently joining together the two or more segments forming the pipe.

In another aspect, the apparatus of the invention includes a means for axially rotating the mandrel and pipe assembly.

In a further aspect, the invention provides a method of forming and testing a pipe comprised of two or more segments, the method comprising:
  providing a mandrel secured to a frame, the mandrel having a length of at least the length of the pipe to be formed;
  providing the pipe segments coaxially over the mandrel and urging the segments together to form the pipe and thereby form a mandrel and pipe assembly including an annular space between the mandrel and the pipe;
  sealing the opposed ends of the annular space;
  welding the joints between the pipe segments;
  filling the annular space with a pressurized fluid; and,
  testing the integrity of the pipe by monitoring the pressure formed within the annular space.

In another aspect, the method of the invention includes the step of axially rotating the mandrel and pipe assembly.

BRIEF DESCRIPTION OF THE DRAWINGS

These and other features of the preferred embodiments of the invention will become more apparent in the following detailed description in which reference is made to the appended drawings wherein:

FIG. 1 is a side elevation of a testing apparatus according to an embodiment of the invention.

FIG. 2 is a top view of the apparatus of FIG. 1.

FIG. 3 is an end elevation of a first end of the apparatus of FIG. 1.

FIG. 4 is an end elevation of the apparatus of FIG. 1 through section A-A.

FIG. 5 is a side elevation of the testing apparatus of FIG. 1 in combination with a pipe to be tested.

FIG. 6 is a partial side elevation detail of FIG. 5.

FIG. 7 is an exploded perspective view of the mandrel of the invention in combination with the mandrel.

FIG. 8 is a partial perspective view of the sealing ring of FIG. 7.

FIG. 9 is a partial side view of the second sealing device of the invention.

FIG. 10 is a perspective view of an embodiment of the first sealing device.

FIG. 11 is a side cross sectional view of another embodiment of the invention.

FIG. 12 is an exploded perspective view of another embodiment of the invention.

FIG. 13 is a side cross sectional view of another embodiment of the invention.

FIG. 16b is a cross sectional elevation of the apparatus of FIG. 14 illustrating the pipe and mandrel.

DESCRIPTION OF THE PREFERRED EMBODIMENTS

Figure 14:
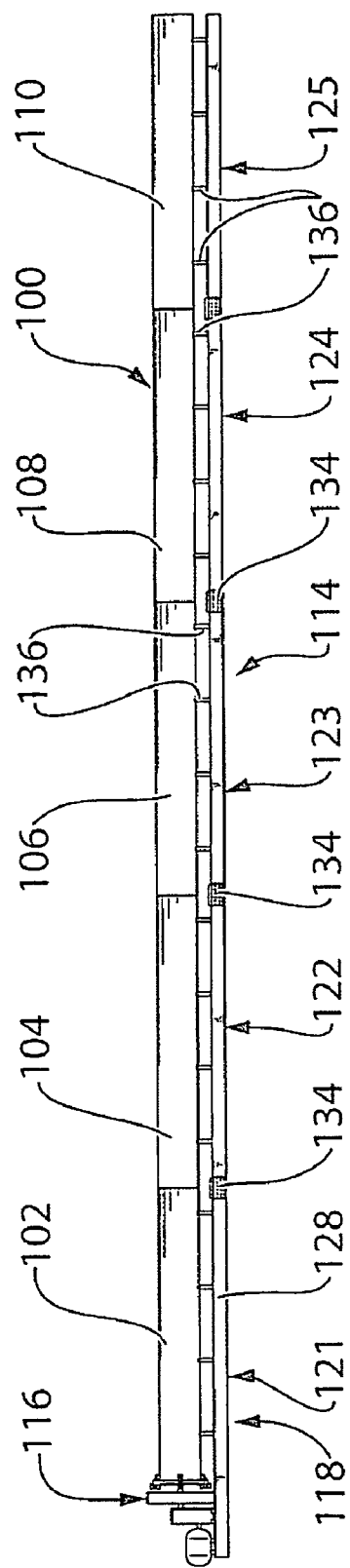
FIG. 14 is a side elevation of a testing apparatus according to another embodiment of the invention.

One or more embodiments of the invention will now be described. However, it will be understood that the following description is not intended to limit the invention to the disclosed embodiments and that various modifications will be apparent to persons skilled in the art.

With reference to FIGS. 1 to 4, the apparatus 10 of the invention includes a frame 12 having a pair of horizontal support members 14 and 16 arranged in a parallel and laterally spaced apart manner. The support members are connected by a base 18 and a support platform 20, secured, respectively, to the bottoms and tops of the horizontal support members 14 and 16. The frame 12 also includes a pair of vertical support members 21 and 22. The support members 14, 16, 20, and 22 may comprise, for example, structural "I" beams. Where necessary, the base 18 may include wheels (not shown) or other such means to facilitate movement or transportation of the apparatus.

The testing apparatus 10 includes a generally cylindrical, and preferably hollow, mandrel 24, which preferably has a length that is greater than the length of the pipe being tested. In operation, as discussed below, the mandrel is designed to be inserted into the lumen of the pipe being tested. Preferably, the mandrel has a diameter that is slightly smaller than that of the pipe being tested and is at least 18" longer than the pipe length; however, persons skilled in the art will understand that other clearances are possible after considering the following description. The mandrel 24 is provided at a first end with a first sealing device 26, which, in one embodiment, comprises a sealing plate, as described further below. In one embodiment, the first sealing device 26 is permanently secured to the mandrel 24 by, for example, welding. In another embodiment, as described further below, the sealing device 26 may be releasably attached to the mandrel. The first sealing device 26 is braced against the vertical support members 21 and 22 and may, in one embodiment, be releasably attached thereto. For example, in one embodiment, the sealing device 26 can be provided in a slot provided by support members 21 and 22 and allowed to move in a limited vertical direction with respect to the support members. As will be apparent in view of the following description, such vertical motion serves to facilitate use of the apparatus.

The support plate 20 is provided with a plurality of support rollers 28 arranged in pairs and designed to support the mandrel 24. As noted in FIG. 4, the support rollers are designed to support the bottom of the mandrel and are angled towards each other so as to prevent the generally cylindrical mandrel from rolling off of the support rollers 28. The apparatus may also include a plurality of alignment rollers 30, also arranged in pairs, to guide and align a pipe to be tested, as will be discussed further below. Briefly, the alignment rollers are provided at the first end 14 of the mandrel to facilitate the sealing of one end of the pipe to be tested by the sealing device 26. It will be apparent that the number of alignment rollers needed will vary depending upon the specific dimensions of the apparatus and that the need number of support and alignment rollers will be apparent to persons skilled in the art. In the example shown in FIGS. 1 to 4, the apparatus includes six pairs of support rollers 28 and three pairs of alignment rollers 30. In the example illustrated in the figures, the alignment rollers are provided in two orientations where two pairs of alignment rollers are provided adjacent pairs of support rollers, to guide and support an end of the pipe being tested, while one pair of alignment rollers is provided on opposite sides of the mandrel diameter to guide or align the pipe end. Further alignment rollers can be provided as necessary.

In FIGS. 1 to 4, the pipe to be tested is indicated at 32. As shown, the pipe 32 is supported on a hoist or sling 34 or other similar mechanism. In the example shown in the figures, the sling simply comprises one or more belts 36 that are used to support the pipe, with the belts being connected to a raising and lowering mechanism, such as a crane. It will be understood that the purpose of the hoist or sling is to raise and/or support the pipe 32 and that various mechanisms can equally be used.

As shown in FIGS. 1 and 2, in use, the pipe 32 is brought into axial alignment with the mandrel 24. As indicated above, the mandrel 24 is sized so as to be able to fit within the lumen of the pipe 32. In one example, for a pipe that is fifty four inches in diameter, the mandrel is preferably fifty inches in diameter. The pipe 32 is urged over the mandrel 24 in the direction indicated by the arrow. This is further illustrated in FIGS. 5 and 6. As shown in FIG. 5, as the pipe 32 is moved towards the mandrel 24, the mandrel is slightly raised and the pipe 32 is slid between the mandrel and the support rollers 28. In one embodiment, the mandrel is provided with a plurality of skid pads 38 to facilitate the insertion of the mandrel 24 into the pipe 32. Skid pads 38 may be made of any material that would serve to reduce the friction between the mandrel 24 and pipe 32 (i.e. a material having a low coefficient of friction) during the insertion step. In one aspect, such material may comprise a tetrafluorethylene material, such as that marketed under the trade name Teflon®. In a preferred embodiment, and as shown in FIG. 6, the skid pads 38 may be provided with a wedge 40 to further facilitate the sliding of the pipe 32 between the mandrel 24 and the support rollers 28.

In the above discussion, reference has been made to the pipe 32 being moved over the mandrel 24. It will be understood by persons skilled in the art that the same result can be achieved by sliding the mandrel 24 into the pipe 32 while maintaining the latter in a relatively fixed position. Further, it is also possible for both the mandrel and pipe to be moved towards each other.

The pipe 32 and mandrel 24 are brought together until a first end of the pipe 32 contacts the first sealing device 26. As mentioned above, the first sealing device is preferably allowed some vertical clearance with respect to support members 21 and 22 of frame 12.

FIG. 7 illustrates the mandrel 24 of the invention after insertion into a pipe 32 to be tested. Also shown is the first sealing device 26 as described previously. As mentioned above, in one embodiment, the sealing device 26 comprises a plate 42 that is of a larger diameter than the pipe 32 being tested. The plate 42 is provided with a circular groove 44 which is sized to be covered by a first end 46 of the pipe 32. A resilient seal 48, such as an "O" ring, is provided within the groove 44 so as to form a seal with the first end 46 of the pipe 32. It will be understood that the seal between the sealing plate 42 and the pipe end 46 will be formed upon forcing the plate and pipe together. This step is discussed further below. Although according to one embodiment of the invention, the first sealing device includes a solid sealing plate, it will be understood that an annular disc, which is described further in relation to FIG. 10, may also be used. Such a disc would also include the resilient seal 48 as described above.

FIG. 7 also shows the second end of the pipe 32, opposite to first end 46. As mentioned above, and as shown in FIG. 7, in one embodiment, the mandrel 24 is sized to be longer than the pipe 32 being tested. This arrangement provides sufficient mandrel surface to secure a second sealing device 50 to the mandrel 24 and, subsequently, to the pipe 32. The second sealing device 50 includes a sealing collar 52, a compression plate 54 and a force applying ring 56, each arranged in respective order from the second end of the pipe 32 extending axially away from the pipe 32. The sealing collar 52, compression plate 54 and force applying ring 56 are each generally annular bodies, each arranged in a co-axial manner over the mandrel 24.

As shown in FIG. 7 and in more detail in FIGS. 8 and 9, sealing collar 52 comprises an annular ring having a first, pipe seal groove 58 and a second mandrel seal groove 60. The pipe seal groove 58 is designed similarly to groove 44 described above, and is a generally circular groove that is sized to diameter of the second end of the pipe 32. The pipe seal groove is provided with a resilient seal 62, such as an "O" ring, and forms a seal with the second end of the pipe 32 when the two are forced together. The mandrel seal groove 60, as shown more clearly in FIG. 9, comprises a bevelled edge on the sealing collar 52. The mandrel seal groove 60 is provided on the inner diameter of the annular collar 52 and on the side opposite that adjacent the pipe 32. A resilient seal 64, such as an "O" ring or other such material, is provided in mandrel seal groove 60 and serves to provide a seal between the collar and the outer circumference of the mandrel 24. As shown in FIG. 9, such seal is created by urging the compression plate 54 is urged towards the sealing ring 52, whereby such urging causes deformation of the resilient seal 64 and tightening of the seal 64 around the circumference of the mandrel 24.

The various seals discussed above are achieved upon the urging of certain members together. As will now be described, all seals can be achieved by one urging step. Specifically, in one embodiment, and as shown in FIGS. 8 and 9, the force applying ring 56 is provided with a plurality of circumferentially spaced hydraulic rams or jacks 66, which are commonly available. The jacks 66 serve to apply pressure to the compression plate 54 as will be discussed further below. Persons skilled in the art, having referenced the present disclosure, will recognize that the hydraulic jacks 66 of the invention can be replaced with various mechanical devices that provide the required force. The jacks 66 are provided on a surface of the force applying ring 56 facing the pipe 32 to be tested. Finally, a plurality of "jack stops" 68 are provided on the outer circumference of the mandrel 24 and serve to brace the force applying ring 56. In one embodiment, the stops 68 comprise bolts that are provided through circumferentially spaced openings 70 in the mandrel. The stops 68 may include threaded portions 72 that extend through openings 70 whereby the bolts are secured to the mandrel 24 with nuts 74 that cooperate with the threaded portions of the stops 68. It will be apparent to persons skilled in the art that various alternatives to the jack stops are possible as well as various other means of securing the stops to the mandrel. For example, in another embodiment, the stops 68 may comprise anchors that are inserted into openings 70.

As shown more clearly in FIG. 9, the mandrel 24 may be provided with a number of series of openings 70, each series being located in different axial positions along the mandrel, to accommodate various lengths of pipes 32.

In use, the pipe 32 is first slid over the mandrel 24 and moved towards the first sealing device 26. The first end of the pipe, adjacent the first sealing device 26, is brought into contact with the sealing plate 42 and, more specifically, the end of the pipe 32 is aligned to overly the seal 48. Following this, the second sealing device 50 is slid over the mandrel's second end, opposite the first sealing device 26.

The second sealing device 50 is installed by first sliding the sealing ring 52, followed by the compression ring 54 and finally by the force applying ring 56. The sealing ring 52 is arranged so as to ensure that the resilient seal 62 contacts the end of the pipe 32. The second sealing device 50 is moved towards the pipe and, finally, the stops 68 are provided on the mandrel at the appropriate series of openings 70. It will be appreciated that, in one embodiment, some force may be applied to the second sealing device 50 prior to inserting the stops 68 so as to "pre-load" the apparatus. Once the stops 68 are installed and, where necessary, secured to the mandrel, the hydraulic jacks 66 are activated.

The jacks 66 serve to force the compression ring 54 and the sealing ring 52 axially towards the second end of the pipe 32. The stops 68 prevent the force applying ring 56 from moving axially away from the pipe 32. Therefore, as will be understood by persons skilled in the art, since the first end of the pipe 32 is forced towards the first sealing device 26, which is secured to the mandrel 24, the force applied by the jacks 66 results in each sealing device 26 and 50 to be forced against the respective ends of the pipe 32. Due to the presence of seals 48, 60 and 62, this, in turn, results in the formation of seals between: a) the first end of the pipe 32 and the first sealing device 26; b) the second end of the pipe and the second sealing device 50; and, c) the mandrel 24 and the second sealing device 50. The result of these seals is the creation of an annular sealed space bounded by the outer surface of the mandrel 24, the inner surface of the pipe 32, and the first and second sealing device 26 and 50. This annular space is partially shown at 76 in FIG. 9.

Once the sealed annular space 76 is created by attaching the two sealing devices 26 and 50, the integrity test on the pipe may be started. The test comprises filling the annular space 76 with a fluid, which is generally an incompressible fluid, and pressurizing such fluid while monitoring the pressure within the annular space 76. This method of testing will be understood by persons skilled in the art.

To fill the annular space 76, the apparatus of the invention requires a means of filling and draining or venting the annular space. FIG. 10 illustrates one embodiment of how such filling occurs, wherein like figures are indicated with the same reference numerals as above but with the letter "a" added for clarity. FIG. 10 shows another embodiment of the first sealing device at 26a. In this embodiment, the first sealing device comprises an annular disc 42a instead of the plate 42 as previously described. The disc 42a is provided with at least one opening 78 extending through the disc 42a. A port 80 extends from the opening 78 and is in fluid communication, through opening 78, into the annular space 76 that is created once the apparatus is assembled with a pipe to be tested. The port 80 is connected to a fluid filling source, not shown, using any known means, such as hoses and the like. It will be understood that any number of ports or openings can be provided on the sealing device 26a. As will be appreciated by persons skilled in the art, having at least one fill port and one vent port will facilitate the filling and voiding of the annular space 76. It will also be appreciated that it may be preferable to have one port vertically higher than the other so as to further facilitate filling and voiding of the annular space. The invention is not limited to any number or positions of the filling/venting ports. It will also be understood that although FIG. 10 depicts an embodiment wherein the first sealing device includes an annular disc, the port 80 can be provided on the plate 42 (of previous figures) as well.

FIG. 11 illustrates a further embodiment of the filling/venting system wherein a port 82 is provided on the mandrel 24. In this embodiment, the port 82 provides an opening 84 into the annular space 76 which is created between the mandrel 24 and the pipe 32 and the sealing devices (only one of which is shown for the purposes of clarity). As shown in FIG. 11, in another embodiment, both ports 80 and 82 may be provided on the same apparatus. As mentioned above, it will be understood by persons skilled in the art that it may be preferable to have one port, for example 80, to be vertically higher than the other port 82 to facilitate the filling and venting process.

As mentioned above, a pressure gauge, not shown, is also provided on the apparatus so as to enable monitoring of the pressure within the annular space 76. In one embodiment, a further port 79 can be provided to which a pressure gauge 81 is permanently attached. In another embodiment, the source of the pressurized fluid may be provided with a pressure gauge as known in the art. Persons skilled in the art will appreciate that any means of monitoring the pressure in the annular space can be used in the invention.

It will be understood by persons skilled in the art that the apparatus of the present invention can be adapted to test pipes of any diameter or length. For example, the apparatus can be used for pipe diameters greater than three inches and for pipe lengths of one foot to one hundred feet. The upper limit of the pipe length is not necessarily limited but, as will be appreciated by persons skilled in the art, any larger length would render the apparatus of the invention very bulky and cumbersome. Furthermore, large lengths of pipe will require increased hoisting force due to the increased weight, making the testing process, although possible to conduct, difficult to manage. As described herein, one of the advantages of the present invention lies in its ability to conduct a pipe test with a minimal amount of testing fluid. Thus, to fully realize this advantage, persons skilled in the art will understand that the mandrel should be sized to be close so that its diameter is close to that of the pipe being tested. In one example, if the pipe being tested is fifty four inches in diameter, the mandrel would preferably be fifty inches in diameter. It will be understood that any dimension would still allow the apparatus of the invention to be operable.

In one embodiment, the second sealing device 50 may be removeably attached to the frame 12 of the apparatus. This aspect is illustrated in FIG. 2 wherein the second sealing device 50 is shown as optionally attached to a swing arm 51. The swing arm 51 is in turn attached to a base 53 that is rotatably attached to the frame 12. In this embodiment, when the second sealing device 50 is needed, it can simply be swung into position and attached as described above. Alternatively, the second sealing device 50 can be provided separately and still secured as described above.

In the above description, reference has been made to a first sealing device, 26 or 26a, that is different in structure to the second sealing device 50. However, it will be understood that the second sealing device 50 can be used on both ends of the pipe 32 being tested.

Further, the above description has referred to the apparatus of the invention as used in a generally horizontal orientation. However, it will be understood that the apparatus can also be arranged in any orientation, for example vertical, and be equally functional. For example, referring to FIG. 1, the first sealing device 26 can form the base of the apparatus and the pipe 32 to be tested slid over the vertically extending mandrel. This type of vertical orientation may not be efficient for larger diameter pipes.

A further embodiment of the invention is illustrated in FIG. 12 wherein like elements are indicated with the suffix "b" for clarity. In FIG. 12, the pipe 32b to be tested is not linear and includes a bend. Such pipes may comprise, for example, elbows, "T" pieces, "Y" pieces etc. In such case the mandrel 24b must also include a bend. It will be appreciated that in some cases, the bend of the pipe 32b is too acute to permit a like-shaped mandrel 24b from being inserted there-through. However, where such insertion is possible, as illustrated in FIG. 12, the mandrel 24b can be provided with first and second sealing device as described above. In the embodiment of FIG. 12, it is noted that the mandrel 24b is to be provided with two alike sealing devices 50b and that each is of a similar construction as the second sealing device 50 described above. It will be understood that one of the sealing devices provided on the mandrel 24b may be permanently affixed such as with first sealing device 26 and 26a discussed above.

It will be understood that the above description has focussed on a pipe 32 having a constant diameter. However, in some cases, the section of pipe to be tested may have differing internal diameters at each end. In such cases, the mandrel 24 used in the apparatus will be sized according to the minimum diameter of the pipe. The first and second sealing devices will, in turn, be sized according to the respective end of the pipe that they are to be associated with.

Another embodiment of the invention is illustrated in FIG. 13 wherein elements that are similar but not the same as those described above are identified with like reference numerals but with the letter "c" added for clarity. In this embodiment the mandrel 24 is provided with a permanently attached flange 88. As known in the art, flange 88 may comprise a generally annular disc having a generally central opening through which, one end of the mandrel 24 can be inserted. The flange 88 may be attached to the mandrel 24 by means of welds 90 or other means as known in the art. The flange 88 includes at least a pair and preferably a plurality of bolt holes through which bolts 92 are extended. The first sealing device may comprise an annular disc, or plate, 42c, which includes a complementary set of openings to accommodate the bolts 92. Nuts 94, cooperating with the bolts 92, are provided to secure and tighten the annular disc 42c to the flange 88. It will be understood that the bolts 92 may be permanently attached to the disc 42c and/or the flange 88, thereby requiring only one end of the bolt 92 to require nuts 94. In this embodiment, the mandrel 24 of the invention can be replaced as needed without replacing the first sealing device. It will be appreciated that this functionality allows the apparatus of the invention to be quickly adapted to any diameter of pipe 32 being tested. In the embodiment of FIG. 13, the vent/fill ports 80 and 82 are shown to be similar to those of FIG. 11.

Further aspects of the invention are illustrated in FIGS. 14 to 21 wherein an apparatus similar to that described above is adapted for testing a length of pipe comprised of various tubular sections that are connected together. As is known in the art, a common form of achieving such connections is by welding. In one aspect, as discussed further below, the apparatus is further adapted to assist the welding of the pipe sections so that the welding and testing step can be conducted sequentially and in a time efficient manner.

Figure 15:
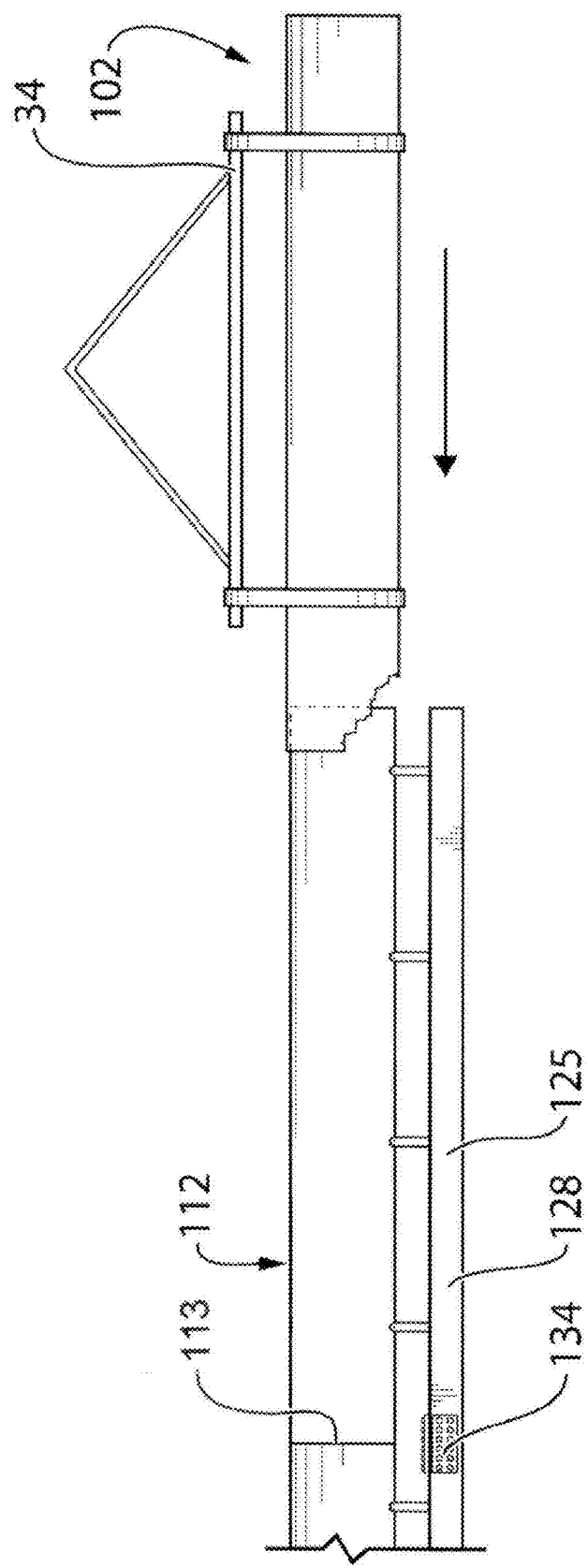
FIG. 15 is a partial side elevation of the apparatus of FIG. 14 illustrating the loading of a pipe segment.

FIGS. 14 and 15 illustrate an aspect of the invention wherein a pipe 100 to be tested is comprised of five segments 102, 104, 106, 108 and 110. Although five segments are shown, it will be understood that a pipe 100 can be formed of any number of segments and that such segment can be of any desired length. For example, in one aspect, each segment can be twenty feet long, thereby resulting in a pipe having a length of one hundred feet. This is, of course, one example and numerous other combinations of number of segments and length of segments would be possible.

As illustrated in FIG. 15 and in a manner similar to that described above, each of the pipe segments are provided over a mandrel 112. To accommodate this, it will be understood that the mandrel 112 will be sized so as to have an outer diameter that is smaller than the inner diameter of the pipe segments. Further, the mandrel 112 may be provided as a single unit or may be comprised of multiple sections that are assembled together. The latter version would be preferred in order to render the mandrel adaptable for any size or length of pipe. That is, by having the mandrel formed with interchangeable sections, the overall length of the mandrel can be easily adjusted. By way of example, FIG. 15 illustrates a seam 113 that is formed at the junction between two mandrel sections. Such seam can, for example, comprise a circumferential weld that connects two adjacent mandrel sections together. Although such welding is preferred, various other connection methods may be used. As will be apparent from the discussion herein, it is preferred that the seams between the mandrel sections be sealed so as to allow the testing procedure to be conducted. Thus, in one embodiment, the seam 113 may include a resilient seal that forms the required seal between adjacent mandrel sections once the sections are forced together. As will be understood, the only requirement is that an annular space is created between the mandrel and the pipe whereby the pipe testing method can be conducted. Thus, various possible sealing methods may be employed for sealing the seams 113 between the mandrel sections.

The length of each mandrel section can optionally correspond with the length of each pipe segment. This allows the overall length of the mandrel to be easily matched to the length of the pipe 100. However, as will be understood, there is no requirement in the manner in which the length of the mandrel is determined. Further, it will be understood that mandrel sections of different diameters can be used with the apparatus of the invention, thereby allowing various diameters of pipe segments to be accommodated.

As with the apparatus described previously, the mandrel 112 and, when loaded, the pipe 100 are supported on a frame 114 having a generally vertically oriented end portion or section 116 and a horizontal main portion or section 118. As with the frame discussed above, the frame 114 shown in FIGS. 14 to 20 can be of any design to serve the purpose described herein. Briefly, the vertical end portion 116 serves to support a first sealing device as discussed above. The horizontal portion 118 of the frame 114 serves to support the mandrel 112 and, when loaded, the pipe 100. In order to accommodate various lengths of pipes and mandrels, the frame can also be modular in design wherein the horizontal portion 118 of the frame 114 is comprised of one or more sections. As shown in FIG. 14, in one embodiment the frame 114 can include five horizontal sections 121, 122, 123, 124, 125. As with the sections of the mandrel 112, this structural arrangement allows the frame 114 to include sections corresponding to the lengths of the pipe segments. In this way, once the number of pipe segments is decided upon, the length of the mandrel 112 and frame 114 can be easily determined by matching the numbers of the respective sections. However, it will be understood that this orientation is simply one embodiment and that there is no requirement that the mandrel or the frame need to be modular or that the lengths of their respective sections must be matched to the lengths of the pipe segments.

Figure 16A:
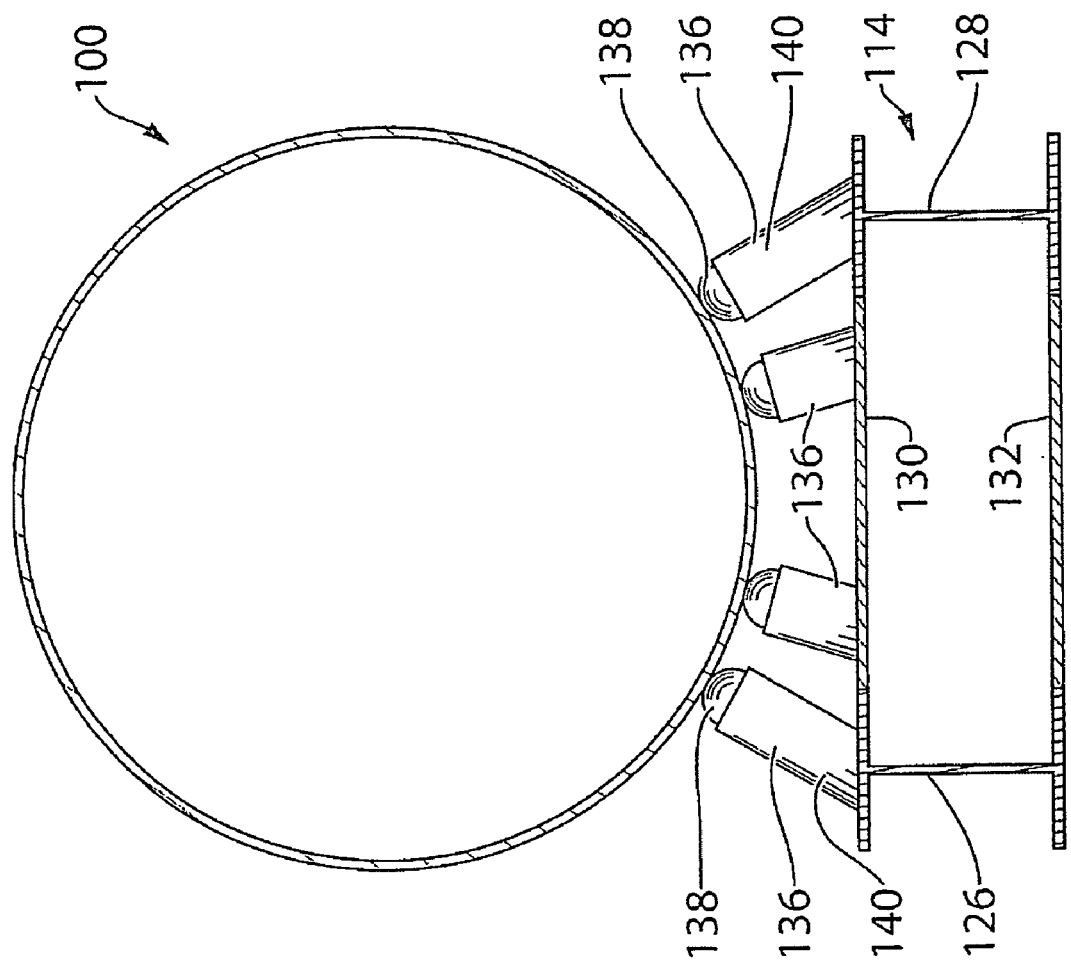
FIG. 16a is a cross sectional elevation of the apparatus of FIG. 14 illustrating the pipe without the mandrel.

The frame 114 can, in one embodiment, have a structure similar to that described above. For example, as shown in FIGS. 14 to 16, the horizontal section 118 of the frame 114 may comprise opposed elongate and horizontally arranged structural members 126 and 128 connected to each other one or more of top and bottom plates. In one embodiment, as shown in FIGS. 16a and 16b, the horizontal section of the frame 114 includes both top and bottom plates 130 and 132, respectively. The structural members 126 and 128 may comprise, in one aspect, "I" beams as are commonly known. Although one preferred structure of the frame 114 is depicted and described, various other structures or orientations may be used with the invention.

As discussed above, in a preferred embodiment, the sections of the mandrel 112 are welded or otherwise sealingly connected together. However, the sections, 121 to 125, of the frame 114 horizontal section 118 may be connected simply by using brackets 134 or any other similar apparatus. As shown in FIGS. 14 and 15, the brackets may comprise a flange that is bolted to adjacent sections of the structural members 126 and 128. In another embodiment, such adjacent sections can be welded together.

As with the previously described embodiment, the frame 114 supporting the mandrel 112 and pipe 100 is provided with a plurality of support rollers 136 substantially along the length of the horizontal portion 118. As shown in FIGS. 16a and 16b, each of the support rollers 136 preferably includes a ball type roller 138 secured within a housing 140, which, in turn, is connected to the upper portion of the horizontal section 118 of the frame 114. The reason for preferably using ball type rollers is discussed below. As shown, in one preferred embodiment, the support rollers 136 are provided in sets of four and are angled so as to receive the curved surfaces of the mandrel 112 and pipe 100. For example, as shown in FIGS. 16a and 16b, the set of four support rollers are arranged with the outer rollers being slightly larger in height than the two inner rollers. It will be understood that although FIGS. 16a and 16b illustrate the rollers as being present in sets of four, in some cases the set may only require two rollers. This would occur, for example, where tubes of small diameter are being tested. In other embodiments, the placement and height of the rollers can be made adjustable to accommodate various dimensions of the pipe and/or mandrel.

As shown in FIG. 15, each of the pipe sections, such as segment 102 as illustrated, is first generally coaxially aligned with the mandrel 112 by means of a hoist 34 similar to that described previously. As will be understood by persons skilled in the art, the hoist 34 can comprise any type of equipment that serves to manoeuvre a pipe segment and to load such segment over the mandrel. For example, the hoist may comprise or be connected to a crane or the like. Once positioned as shown in FIG. 15, the pipe segment is then slid over the mandrel 112. During this process, the mandrel 112 is displaced off of the rollers 136 by the pipe segment 102 with the rollers 136 assisting with sliding the pipe segment 102 axially over the mandrel 112.

Figure 17A:
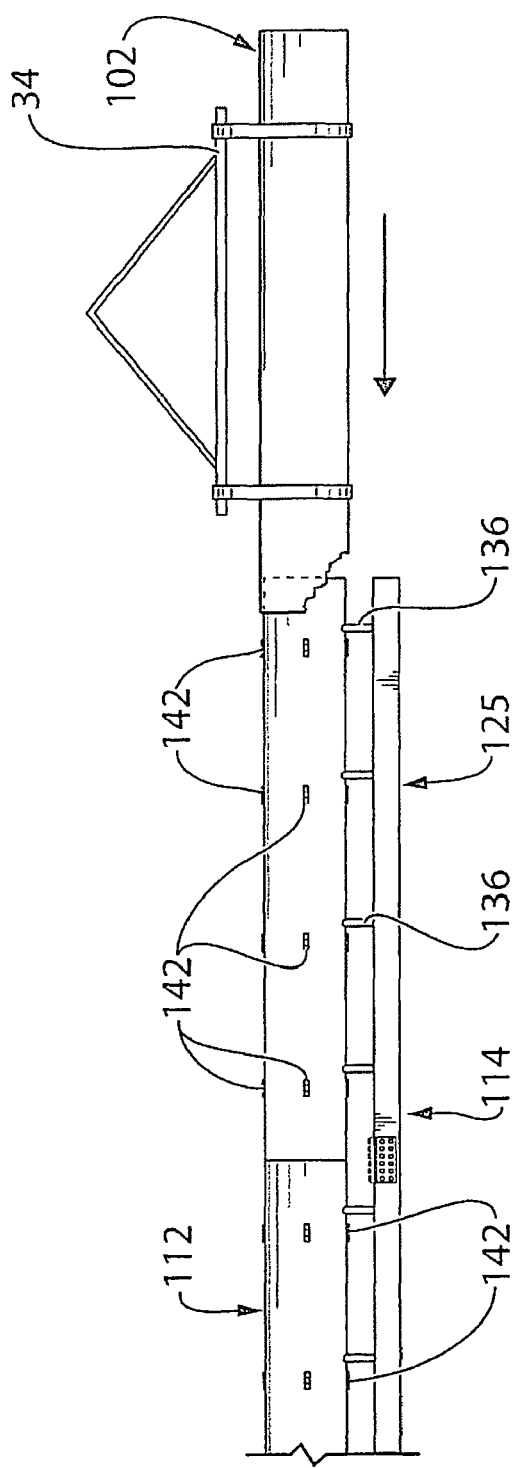
FIG. 17a is a partial side elevation of an embodiment of the apparatus of FIG. 14 illustrating the loading of a pipe segment onto a mandrel including exterior skid pads.

As shown in FIG. 17a, the outer surface of the mandrel 112 is preferably provided with a plurality of skid pads 142 to assist in passing the pipe segments there-over and to also assist in positioning the mandrel within the lumen of the pipe so as to prevent the bottom surface of the mandrel from resting on the pipe. The former function serves to minimise friction between the pipe and the mandrel surfaces as the two are moved with respect to each other. In this regard, the skid pads 142 may preferably be made of a material with a low coefficient of friction. As discussed above, it is preferred to have the skid pads 142 either made from or coated with a tetrafluorethylene material such as Teflon®. With regard to the mandrel positioning function of the skid pads 142, as indicated herein, the testing procedure for the pipe 100 utilizes an annular space created between the mandrel and the pipe once the pipe is in position. As such, the mandrel would need to be raised so as to prevent continuous contact between the mandrel and the pipe surface. Although FIG. 17a illustrates the use of skid pads 142, it will be understood by persons skilled in the art that any other similar device may be used. For example, the skid pads 142 may be replaced with wheels or rollers provided on the outer surface of the mandrel or any other similar device. For example, the skid pads 142 may be replaced with ball type rollers contained within respective housings mounted on the mandrel surface. In addition, FIG. 17a illustrates the provision of skid pads 142 over the entire surface of the mandrel. Such arrangement serves to guide the pipe during the insertion step. However, as discussed previously, the skid pads 142 (or equivalently functioning wheels or rollers etc.) may only be provided on the bottom surface of the mandrel 112.

Figure 17B:
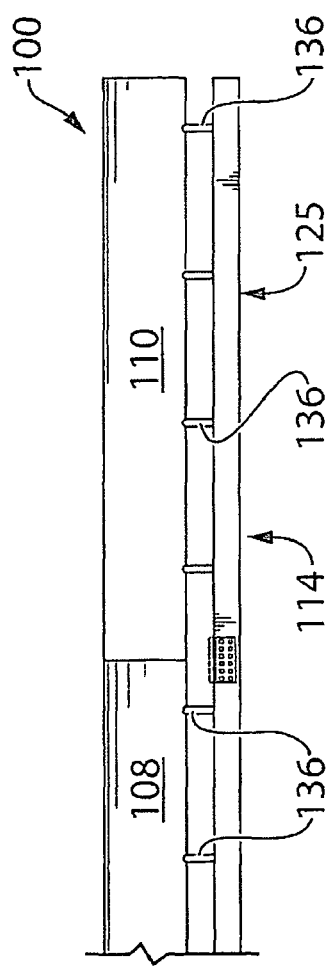
FIG. 17b is a partial side elevation of the apparatus of FIG. 17b after loading of the pipe segments.

FIG. 17b illustrates the mandrel of FIG. 17a after the pipe segments are loaded. As shown, the end of the pipe 100 is comprised of segments 108 and 110. As also shown in FIGS. 17a and 17b, the support rollers 136 serve to support the mandrel 112, when no pipe segment is loaded, and also the pipe 100, after the pipe segments are loaded.

Figure 18:
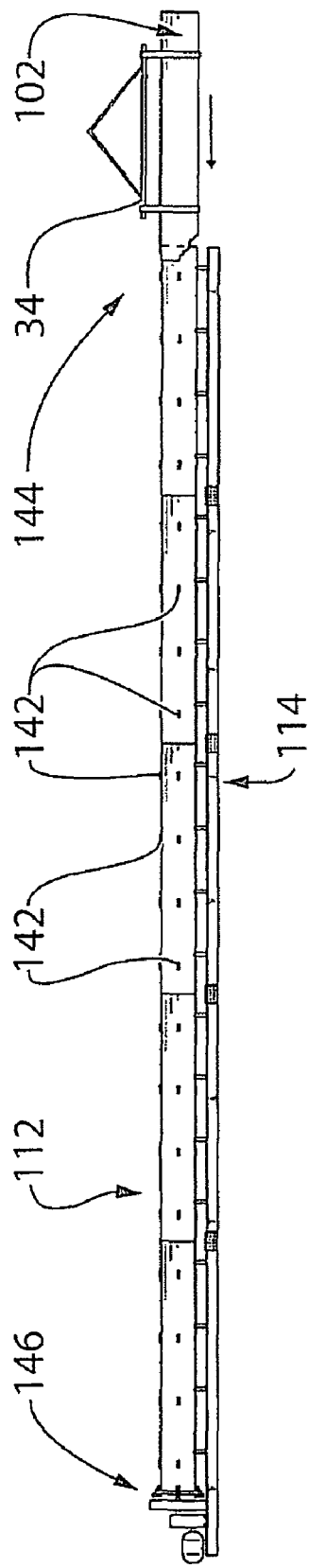
FIG. 18 is a side elevation of an embodiment of the apparatus of FIG. 14 illustrating a mandrel including exterior skid pads.
Figure 19:
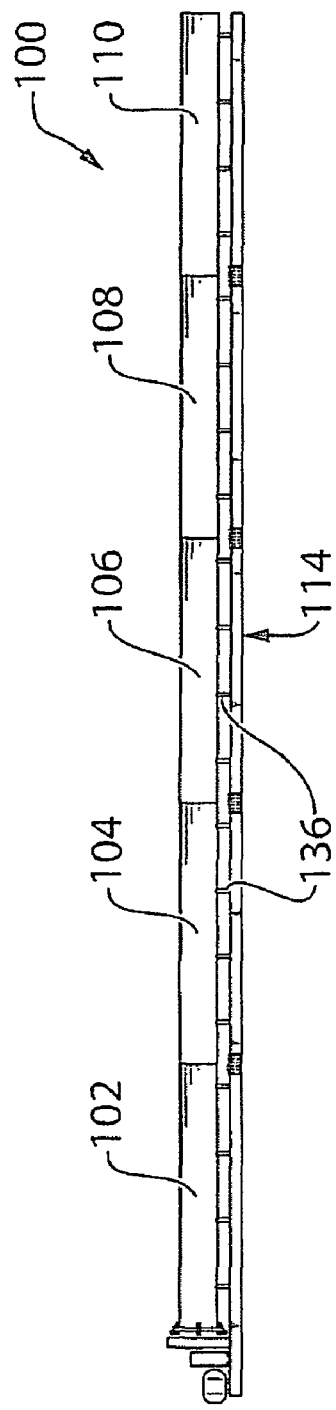
FIG. 19 is a side elevation of the apparatus of FIG. 18 with pipe segments loaded.

FIG. 18 illustrates a complete mandrel 112 of the invention showing the preferred embodiments wherein skid pads 142 are provided on the exterior surface of the mandrel. FIG. 18 further illustrates the mounting of the first pipe segment 102 over the mandrel. As shown, the first segment 102 is aligned with the rear end 144 of the mandrel and slid over the entire length until it reaches the mandrel front end 146. FIG. 19 illustrates the complete pipe 100 (including all segments 102 to 110) after loading on to the mandrel 112. As discussed above, the pipe 100 is supported on the support rollers 136.

Referring again to FIGS. 16a and 16b, a segment of the pipe 100 is shown in cross section in the mounted position on the support rollers 136. FIG. 16a illustrates the pipe without the mandrel whereas FIG. 16b illustrates the mandrel and pipe combination. FIG. 16b also illustrates the skid pads 142 that may be provided on the mandrel 112. As shown, in one embodiment, the mandrel 112 and skid pads 142 are sized so as to provide contact between the inner surface of the pipe 100 and the skid pads 142. As discussed above, FIGS. 16a and 16b illustrate an embodiment of the invention wherein the support rollers 136 are of the ball-type. As also discussed above, such ball-type rollers offer various advantages in terms of manoeuvring the mandrel 112 and/or the pipe 100 since the rolling balls 138 allow for motion in various directions. However, it will be understood that the present invention is not limited to this type of support rollers and that various alternative support means can be used. For example, in one embodiment the ball-type rollers may be replaced with wheels (not shown in the figures). Such wheels may be pivotally arranged in a manner similar to casters. Alternatively, the wheels may be aligned for rotation in a plane parallel to the longitudinal axis of the mandrel. Such an arrangement would allow for a pipe 100 to be slid over the mandrel 112 but would generally not allow the pipe 100 to be rotated about its axis. However, as discussed below, this arrangement would also be functional with the invention.

Figure 20A:
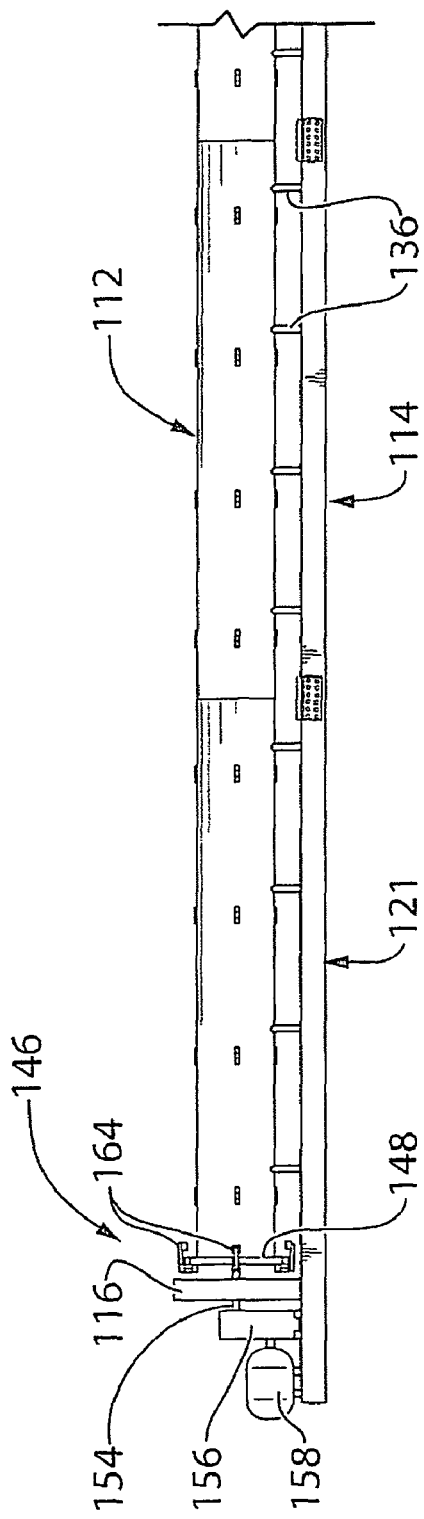
FIG. 20a is a partial side elevation of the apparatus of FIG. 17a illustrating the motor and gearbox for mandrel and pipe rotation.
Figure 20B:
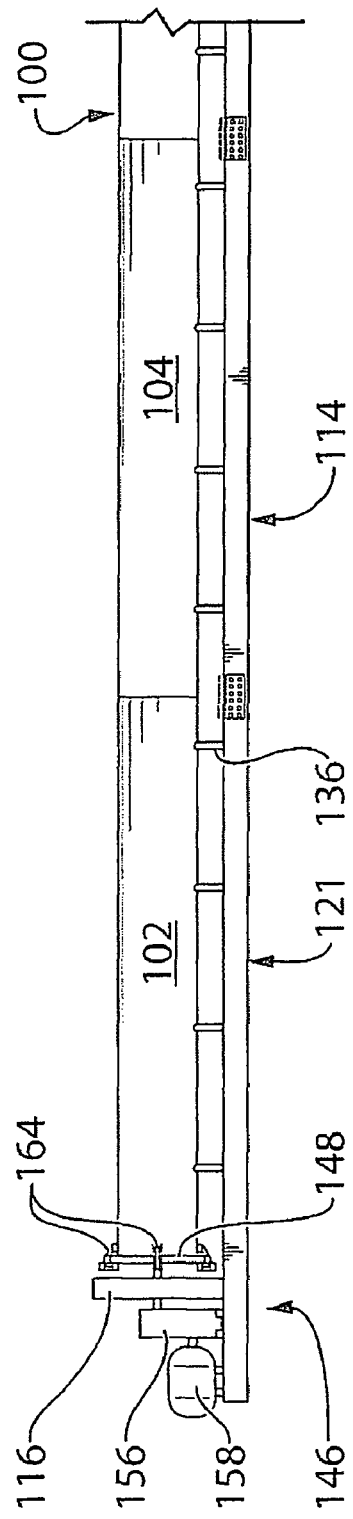
FIG. 20b is a partial side elevation of the apparatus of FIG. 20b after loading of the pipe segments.
Figure 21:
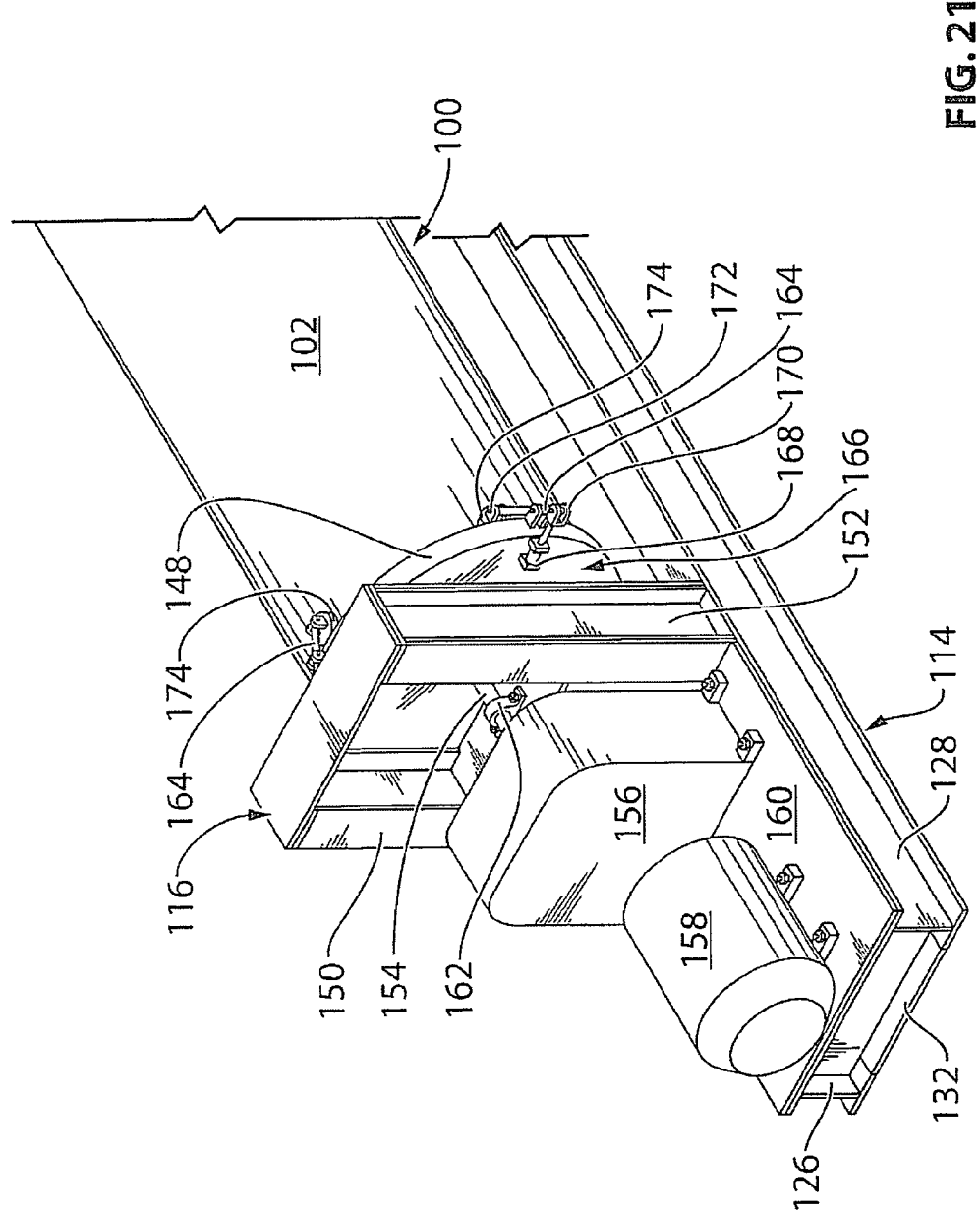
FIG. 21 is a perspective view of the apparatus of FIG. 20.

FIGS. 20a, 20b and 21 illustrate the front end 146 of the apparatus, which includes the generally vertical section 116 of the frame 114. As shown and as described in accordance with previous embodiments, the end of the mandrel 112 adjacent to the front end 146 of the apparatus includes an end plate 148. The end plate 148 is provided as a cover over the end of the mandrel and is provided with a diameter that is sufficient to also cover the opening of the pipe. The end plate 148, as before, is preferably provided with a means for sealing the end of the pipe. In one embodiment, the end plate 148 is provided with a generally circular groove (not shown in FIGS. 20a, 20b and 21) that corresponds to the diameter of the pipe being tested and is adapted to receive the end of the pipe therein. The groove is provided with a resilient sealing material so as to form a seal between the plate 148 and the end of the pipe upon urging of the pipe into the groove. Such a sealing arrangement was described above in connection with the other figures contained herein and would be understood by persons skilled in the art. In one embodiment the end plate 148 is permanently attached or otherwise secured to the end of the mandrel 112.

As with previously described embodiments, the end plate 148 can be secured to the vertical section 116 of the frame 114 in various ways. For example, the plate 148 can be secured to upright structural members 150 and 152 of the frame. However, in the embodiment shown in FIGS. 20a, 20b and 21 the end plate 148 is attached to a drive shaft 154, which, in turn, is connected to a gear box 156 and an associated motor 158. The gear box 156 and motor 158 are secured to the frame 114. In one embodiment, as shown in FIG. 21, the frame 114 is provided with a platform 160 onto which the motor 158 and gear box 156 are secured by bolts or other such fasteners. A bearing 162 may be provided on the frame vertical section 116 to support the drive shaft. The drive shaft 154 is secured to the end plate 148 in such a manner that rotation of the drive shaft 154 (as a result of the motor and gear box), drives the rotation of the end plate 148. Since the plate is, in this embodiment, secured to the mandrel, it will be understood that rotation of the plate 148 results in rotation of the mandrel 112 about its longitudinal axis.

The rear end of the mandrel includes a second sealing device such as that described above. In this regard, reference is made to the examples illustrated in FIGS. 7 to 9. As discussed in reference to such figures, once the second sealing device is secured to the pipe 100 and mandrel 112, a sealed generally annular space is formed between the mandrel 112, the pipe 100 and opposed sealing devices on the ends of the pipe. As discussed above, the first sealing device comprises the end plate 148. The second sealing device imparts a compressive force on the opposite end of the pipe 100 thereby creating the required seals.

Once the pipe 100 is mounted on the mandrel 112, rotation of the mandrel will thereby result in rotation of the pipe as well. In this regard, as shown in FIG. 16, the support rollers 136 allow the pipe to be circumferentially rolled there-over. Thus, as will be understood, the support rollers 136 are designed to roll in a direction parallel to the mandrel axis (for assisting in loading the pipe over the mandrel) and in a direction perpendicular to the mandrel axis (for assisting in the axial rotation of the pipe/mandrel combination).

As indicated above, in one embodiment, the skid pads 142 and/or mandrel 112 may be sized so as to correspond with the inner diameter of the pipe 100 so as to form a friction fit between the pipe and the skid pads. Since the pads 142 are secured to the mandrel, it will be understood that such arrangement serves to assist in the rotation of the pipe as the mandrel is rotated.

FIG. 20a illustrates the front end 146 of the apparatus and shows the mandrel 112 prior to loading of the pipe segments. FIGS. 20b and 21 illustrate the apparatus after the pipe segments are loaded.

In one embodiment, as shown for example in FIGS. 20a, 20b and 21, the end plate 148 may be provided with a number of gripper or guide arms 164 for assisting in positioning and/or securing the pipe 100. The securing of the pipe will assist in causing the pipe to be rotated as the mandrel is rotated. FIG. 20a shows the guide arms 164 in an "open" or retracted position wherein the arms are adapted to receive a pipe segment. FIG. 20b shows the guide arms 164 in a "closed" position wherein the pipe segment 102 is "gripped" and maintained in position. As shown more clearly in FIG. 21, the guide arms 164 are secured to the rear face 166 of the end plate 148, that is, the face located opposite to the mandrel 112. The guide arms 164 are circumferentially spaced about the end plate 148 with the number of guide arms 164 being variable depending on, for example, the diameter of the pipe. In one embodiment, as shown in FIGS. 20a, 20b and 21, four guide arms 164 may be provided with each being spaced approximately 90° from each other along the circumference of the end plate 148. The guide arms 164 include a base 168 that is secured to the rear face 166 of the end plate 148. The arms 164 preferably include one or more hinges 170 to allow the arms to articulate. The arms 164 also include a bearing end 172, which includes a bearing pad 174. The bearing pad is adapted to contact the outer surface of the pipe 100 and may be formed from any material that would be apparent to persons skilled in the art. In one embodiment, the bearing pads 174 may be formed of a rubber or rubber-like material to facilitate gripping of the pipe surface. However, the bearing pads are not limited to such material. The guide arms 164 are designed to be moveable between an open position and a closed position. In the open position, the arms 164 are retracted thereby allowing the pipe 100 to be engaged within the groove provided in the end plate 148 (as described above). During this process, the guide arms 164 may be adjusted to allow the pipe 100 to fit between the bearing pads 174, thereby ensuring that the pipe 100 is received into the aforementioned groove. Once the pipe 100 is thus positioned, the guide arms 164 may be extended whereby the bearing pads 174 are forced against the outer surface of the pipe 100. This allows the guide arms 164 to grip the outer surface of the pipe. This arrangement assists rotation of the pipe during rotation of the mandrel. It will be understood that although the guide arms 164 have been described in terms of two functions, namely positioning and anchoring of the pipe with respect to the end plate 148 of the mandrel 112, such arms may serve one of such functions as needed. It will also be understood that the guide arms 164 may be omitted altogether.

The purpose of rotating the mandrel will now be discussed. In view of the fact that the pipe 100 according to this embodiment is comprised of various segments, such segments must first be welded together to form a contiguous pipe. Such welds would then need to be tested for integrity before the pipe is put into use. Thus, the present invention allows the joining of the pipe segments and the testing of the formed pipe to be conducted in a time and cost efficient manner. The process for doing this involves first the mounting of the desired pipe segments over the mandrel 112. As discussed above, this is accomplished by positioning and guiding each pipe segment over the mandrel 112. Once the desired segments are arranged, the sealing devices are engaged so as to apply an axial compressive force upon the pipe 100. at this time, the motor is engaged and the mandrel 112, with pipe 100 mounted thereon, is rotated over the support rollers 138. As the pipe 100 is thus rotated, one or more manual or automated welding apparatuses are used to weld each seam between adjacent segments of the pipe 100. Once all the seams are welded and a contiguous pipe 100 formed, the welds are allowed to cool.

Once the welds are cooled, the testing phase may begin. At this point, the one or more ports provided on the sealing devices and/or the mandrel (shown, for example, in FIGS. 10, 11, 13) are used to fill the sealed annular space between the mandrel 112 and the pipe 100 with a pressurized fluid. The annular space is pressurized to a desired value and such pressure is then monitored for any drops. A pressure drop would signify a defect in one or more of the welds. In such case, the annular space is depressurized and the seams re-welded or checked.

As discussed above, in one alternative embodiment, the ball-type support rollers 136 may be replaced with pivoting wheels or casters. Such an arrangement would still allow the pipe 100 to be rotated about its longitudinal axis. However, in another embodiment described above, the ball-type support rollers are replaced with wheels that rotate in one direction, allowing the pipe 100 to be slid over the mandrel but not facilitating axial rotation of the pipe. In such case, the pipe 100 may be raised above such wheels and rotated by means of the motor as described above. However, in yet another embodiment, the pipe may be maintained in position over the wheels (or even the support rollers 136) in which case the welding equipment may be rotated about the circumference of the pipe 100 at each segment joint. Although such an arrangement may not be preferable in all cases, the invention will be understood to include same.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. An apparatus for forming and testing the integrity of a pipe, said pipe having a first end with a first opening and a second end with a second opening, the pipe being formed of two or more segments, the apparatus comprising:

a frame having a first end and a second end;

an elongate mandrel having first and second ends and a length corresponding at least to the length of the pipe and an outer diameter less than the inner diameter of said pipe wherein, when in use, said mandrel is adapted to be received within the pipe to form a mandrel and pipe assembly;

the mandrel being supported on said frame and with the first end of the mandrel being secured to the first end of the frame;

the first end of the mandrel including a first sealing device for sealing the first opening of the pipe and the second end of the mandrel including a second sealing device for sealing the second opening of the pipe, whereby, when in use, a generally annular space is created between said mandrel, said pipe, and said first and second sealing devices;

the apparatus including one or more ports for filling said annular space with a pressurizing fluid or for voiding said annular space of air or said fluid and a means for monitoring the pressure within said annular space; and the apparatus further including a means for permanently joining together the two or more segments forming said pipe.

2. The apparatus of claim 1 wherein said means for joining said two or more segments comprises at least one welding device.

3. The apparatus of claim 2 further comprising a means for rotating the mandrel and pipe assembly, when said pipe is mounted over the mandrel, about the longitudinal axis of said mandrel.

4. The apparatus of claim 3 wherein said frame includes a plurality of support rollers provided on the frame for supporting the mandrel or the mandrel and pipe assembly.

5. The apparatus of claim 4 wherein said support rollers allow movement of the pipe in a direction parallel to the longitudinal axis of the mandrel, for assisting positioning of the pipe over the mandrel, and allow the pipe to rotate axially about the longitudinal axis of the mandrel.

6. The apparatus of claim 5 wherein said mandrel further includes a plurality of circumferentially and longitudinally spaced extensions extending radially outwards on the exterior surface thereof, said extensions being adapted to contact the interior surface of the pipe and thereby, when in use, allow the positioning of the mandrel within the pipe.

7. The apparatus of claim 6 wherein said first sealing device comprises an end plate secured to the mandrel, said plate including a sealing means for forming a seal with the first end of the pipe.

8. The apparatus of claim 7 wherein the second sealing device comprises:

an annular sealing ring, coaxially provided over said mandrel adjacent the second end of said pipe, said sealing ring having an outer diameter greater than the diameter of said pipe;

said sealing ring including a first seal adapted to form a seal between said sealing ring and one of said pipe ends and a second seal adapted to form a seal between said sealing ring and the outer diameter of said mandrel; and, a means for forcing said sealing ring towards said pipe.

9. The apparatus of claim 8 wherein said means for rotating comprises a drive shaft having a first end connected to a drive means and a second end connected to the end plate of the first sealing device, wherein, when in use, rotation of the first sealing means causes rotation of the mandrel.

10. The apparatus of claim 9 wherein said end plate includes two or more guide arms for positioning or retaining the pipe once positioned over the mandrel.

11. The apparatus of claim 10 wherein said frame and said mandrel are adjustable in length for accommodating different lengths of said pipe.

12. A method of forming and testing a pipe comprised of two or more segments, the method comprising:

providing a mandrel secured to a frame, the mandrel having a length at least the length of the pipe to be formed;

providing said pipe segments coaxially over the mandrel and urging said segments together to form the pipe and thereby form a mandrel and pipe assembly including an annular space between the mandrel and the pipe;

sealing the opposed ends of said annular space;

welding the joints between said pipe segments;

filling said annular space with a pressurized fluid; and, testing the integrity of said pipe by monitoring the pressure formed within the annular space.

13. The method of claim 12 further comprising axially rotating the mandrel and pipe assembly during the welding step.

14. The method of claim 13 further including frictionally securing said pipe to said mandrel whereby axial rotation of the mandrel results in axial rotation of said pipe.

15. The method of claim 14 further comprising axially removing said pipe from the mandrel following the testing step.

* * * * *